(12) United States Patent
Nam

(10) Patent No.: US 10,116,992 B2
(45) Date of Patent: Oct. 30, 2018

(54) METHOD OF PROVIDING PROGRAM MONITORING INFORMATION AND BROADCASTING SYSTEM USING THE SAME

(71) Applicant: Alticast Corporation, Seoul (KR)

(72) Inventor: Sung Woo Nam, Seoul (KR)

(73) Assignee: Alticast Corporation, Seoul (KR)

( * ) Notice: Subject to any disclaimer, the term of this patent is extended or adjusted under 35 U.S.C. 154(b) by 0 days.

(21) Appl. No.: 14/020,520

(22) Filed: Sep. 6, 2013

(65) Prior Publication Data

US 2014/0068647 A1 Mar. 6, 2014

(30) Foreign Application Priority Data

Sep. 6, 2012 (KR) .................. 10-2012-0098701

(51) Int. Cl.
| | |
|---|---|
| *H04N 7/173* | (2011.01) |
| *H04N 21/442* | (2011.01) |
| *H04H 60/65* | (2008.01) |
| *H04N 21/25* | (2011.01) |
| *H04N 21/258* | (2011.01) |
| *H04N 21/482* | (2011.01) |
| *H04H 60/44* | (2008.01) |
| *H04H 60/45* | (2008.01) |
| *H04H 60/80* | (2008.01) |
| *H04H 60/33* | (2008.01) |

(52) U.S. Cl.
CPC ...... *H04N 21/44222* (2013.01); *H04H 60/44* (2013.01); *H04H 60/45* (2013.01); *H04H 60/65* (2013.01); *H04H 60/80* (2013.01); *H04N 21/252* (2013.01); *H04N 21/25891* (2013.01); *H04N 21/4826* (2013.01); *H04H 60/33* (2013.01)

(58) Field of Classification Search
CPC .............................................. H04N 21/44222
USPC .................... 725/114; 348/564, 565, 563
See application file for complete search history.

(56) References Cited

U.S. PATENT DOCUMENTS

| | | | | |
|---|---|---|---|---|
| 6,754,904 | B1 * | 6/2004 | Cooper ................. | G06Q 10/10 348/E7.071 |
| 8,508,664 | B2 * | 8/2013 | Oh .............................. | 348/565 |
| 9,113,107 | B2 * | 8/2015 | Jolna ..................... | G06Q 30/02 |
| 2008/0055470 | A1 * | 3/2008 | Garg ....................... | H04N 5/45 348/564 |
| 2009/0293079 | A1 * | 11/2009 | McKee ................ | G06Q 10/105 725/10 |
| 2010/0235852 | A1 * | 9/2010 | Mears .................... | H04H 60/33 725/9 |
| 2011/0247038 | A1 * | 10/2011 | Roberts ............. | H04N 5/44513 725/46 |

(Continued)

*Primary Examiner* — Jefferey F Harold
*Assistant Examiner* — Omer Khalid
(74) *Attorney, Agent, or Firm* — Mintz Levin Cohn Ferris Glovsky and Popeo, P.C.; Kongsik Kim; Jonathon Western

(57) ABSTRACT

A method of providing program monitoring information and a broadcasting system using the same are provided, which can inform a viewer of program change circumstances made by other people. A user terminal of the broadcasting system may include a display unit configured to display a particular program; and a monitoring information manager unit configured to display program monitoring information through the display unit. Here, the program monitoring information includes the program change information of at least one other terminal different from the user terminal.

7 Claims, 13 Drawing Sheets

(56) References Cited

U.S. PATENT DOCUMENTS

2013/0268973 A1\* 10/2013 Archibong ............ G06Q 50/01
725/51

\* cited by examiner ers will only watch broadcasts that they have selected, and frequently, there are occasions on which a viewer misses an interesting program airing on another channel. Also, viewers wish to receive real-time information on interesting programs, but there is no such service actually being provided to satisfy these viewers' demands.

METHOD OF PROVIDING PROGRAM MONITORING INFORMATION AND BROADCASTING SYSTEM USING THE SAME

CROSS-REFERENCE TO RELATED APPLICATIONS

This application claims the benefit of Korean Patent Application No. 10-2012-0098701, filed on Sep. 6, 2012, the disclosure of which is incorporated herein by reference in its entirety.

TECHNICAL FIELD

The present invention relates to a method of providing program monitoring information and a broadcasting system using the same.

RELATED ART

Viewers will only watch broadcasts that they have selected, and frequently, there are occasions on which a viewer misses an interesting program airing on another channel. Also, viewers wish to receive real-time information on interesting programs, but there is no such service actually being provided to satisfy these viewers' demands.

SUMMARY

An aspect of the invention is to provide a method of providing program monitoring information and a broadcasting system using the method that can inform the viewer of program changes made by other people.

To achieve the objective above, an embodiment of the invention provides a user terminal that includes: a display unit configured to display a particular program; and a monitoring information manager unit configured to display program monitoring information through the display unit. Here, the program monitoring information includes the program change information of at least one other terminal different from the user terminal.

An embodiment of the invention provides a method of controlling the operation of a remote controller device connected with a user terminal that includes: receiving program monitoring information; and displaying the received program monitoring information on a display unit of the remote controller device. Here, the program monitoring information includes information on a program-changing circumstance when at least one other terminal different from the user terminal moves from a first program to a second program.

An embodiment of the invention provides a server connected with a first terminal and at least one second terminal that includes: a collector unit configured to collect program viewing information from the second terminal; and an information unit configured to transmit program monitoring information based on the collected program viewing information to the first terminal. Here, the program monitoring information includes program change information of the second terminal.

An embodiment of the invention provides a method of providing program monitoring information that includes: showing a first program on a first terminal; and showing program monitoring information based on program viewing information of second terminals different from the first terminal on the first terminal together with the first program.

A method of providing program monitoring information and a broadcasting system using this method can inform a user (viewer) of channel-changing circumstances made by other people, allowing the user to identify interesting programs, etc., through the channel-changing circumstances of other people and switch to a corresponding channel. Thus, the user can watch programs without missing interesting or topical programs and can also watch the corresponding programs according to the viewing behaviors of close associates.

Also, the program monitoring information can be provided visually on the screen of a broadcast terminal to garner the interest of the viewer. Furthermore, the user can use the broadcast terminal with greater convenience, as the user can make a selection for certain program monitoring information and immediately switch to the corresponding channel.

Additional aspects and advantages of the present invention will be set forth in part in the description which follows, and in part will be obvious from the description, or may be learned by practice of the invention.

DETAILED DESCRIPTION

Figure 1:
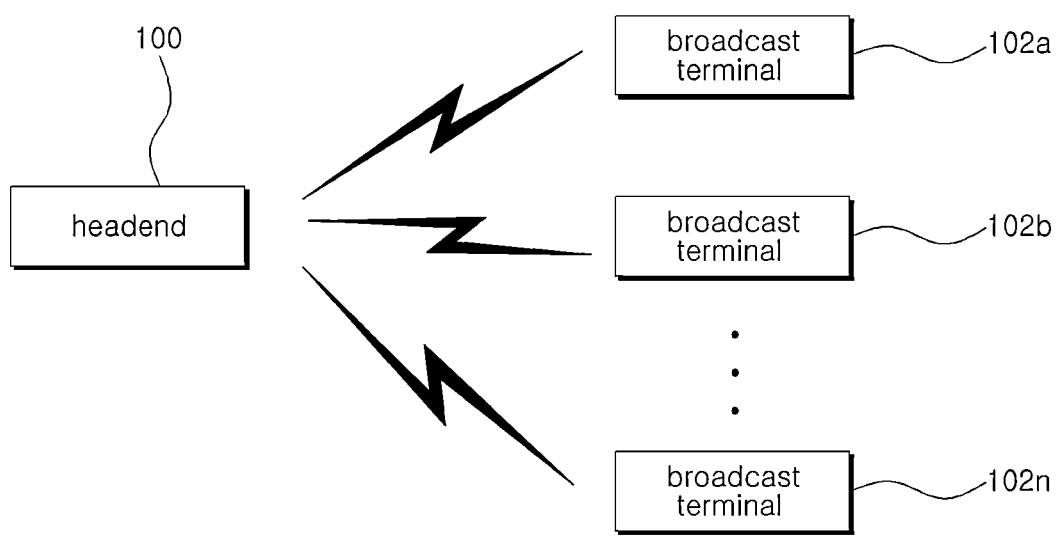
FIG. 1 illustrates a broadcasting system according to a first embodiment of the invention.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

Certain embodiments of the invention are described below in more detail with reference to the accompanying drawings.

FIG. 1 illustrates a broadcasting system according to a first embodiment of the invention.

Referring to FIG. 1, a broadcasting system may include a headend 100 of a broadcasting station and at least one broadcast terminal 102.

The headend 100 may be a broadcasting station equipment, for example, and may transmit broadcast programs to the broadcast terminals 102 via wired or wireless connections. According to an embodiment of the invention, the headend 100 may monitor the channel-viewing circumstances of viewers to generate program monitoring information and transmit the generated program monitoring information to a corresponding broadcast terminal 102. In particular, the program monitoring information can include program change information of viewers that were watching the same program. For example, among the viewers watching a channel broadcasting "Infinite Challenge", some may change to another channel, and in this case, the headend 100 can generate the program monitoring information by collecting such channel-changing circumstances and can transmit the program monitoring information thus generated to the broadcast terminals 102 of viewers continuously watching "Infinite Challenge", for example in a periodic manner. According to another embodiment of the invention, the headend 100 can transmit only the broadcast programs to the broadcast terminal 102, while an external device communicating with the headend 100 can collect the channel-changing circumstances of viewers to generate program monitoring information and can transmit the program monitoring information thus generated to the corresponding broadcast terminals 102 either directly or via the headend 100.

The collecting of the program change information can be performed after a viewer watches a changed program or channel for a predetermined amount of time or longer. If the program change information is collected just because the channel was changed even when the viewer was not actually watching a program, then the program-changing circumstances of the viewers might not be accurately reflected, and moreover, the system load may be increased considerably.

A broadcast terminal 102 can be any device capable of displaying a broadcast program, such as for example a TV, smart phone, tablet PC, etc. The broadcast terminal 102 can receive a broadcast program from the headend 100 and display the broadcast program, and the program monitoring information transmitted from the headend 100 or an external device can be shown via the display unit of the broadcast terminal 102. The broadcast terminal 102 can also be referred to as a user terminal from the perspective of the individual viewer.

According to an embodiment of the invention, the broadcast terminal 102 can, during the displaying of the broadcast program, display the program monitoring information over the broadcast program.

According to another embodiment of the invention, the broadcast terminal 102 can synthesize the broadcast program with the program monitoring information to display them on the display unit.

According to yet another embodiment of the invention, the headend 100 or an external device can synthesize the broadcast program with the program monitoring information to generate a synthesized broadcast program, and can transmit the synthesized broadcast program to the broadcast terminal 102. The broadcast terminal 102 can then display the transmitted synthesized broadcast program.

In short, the broadcast terminal 102 of this embodiment can show the program monitoring information over a broadcast program, preferably in a visual manner. Here, the program monitoring information can include the channel-changing information of viewers who have changed from the broadcast program currently being watched by the viewer to a broadcast program on another channel.

For example, the program monitoring information can include the percentage of viewers who were watching channel no. 1 who changed to channel no. 2, the percentage of viewers who changed to channel no. 3, and the like. Thus, a user can identify the channel-changing circumstances of viewers who were watching the channel that the user is watching, and through the channel-changing circumstances, can obtain information on a more interesting broadcast program being broadcasted on a different channel or information on a broadcast program that is of topical importance in real time such as a World Cup soccer match, etc. Consequently, the viewer can switch channels to a topical broadcast program for greater enjoyment of the broadcast channels.

According to another embodiment of the invention, the program monitoring information can include the channel-viewing information of other viewers who have similar preferences as the viewer. That is, the viewer can identify broadcast programs that could be more enjoyed by the viewer through the channel-viewing circumstances of other viewers having similar preferences as him/herself. Here, the viewers' preferences can be identified through the corresponding viewers' profiles or through the viewers' viewing histories. Also, the preferences of the viewers can also be identified based on information inputted personally by the viewers themselves.

Although the description above is provided using an example relating to broadcast programs, with the viewer being provided with viewing statuses, it is also possible to provide the viewer with viewing statuses for other types of programs such as VOD, recordings, etc., from viewers having similar preferences.

Below, a description is provided of a method of providing program monitoring information according to an embodiment of the invention, using an example relating to broadcast programs for the sake of convenience.

Figure 2:
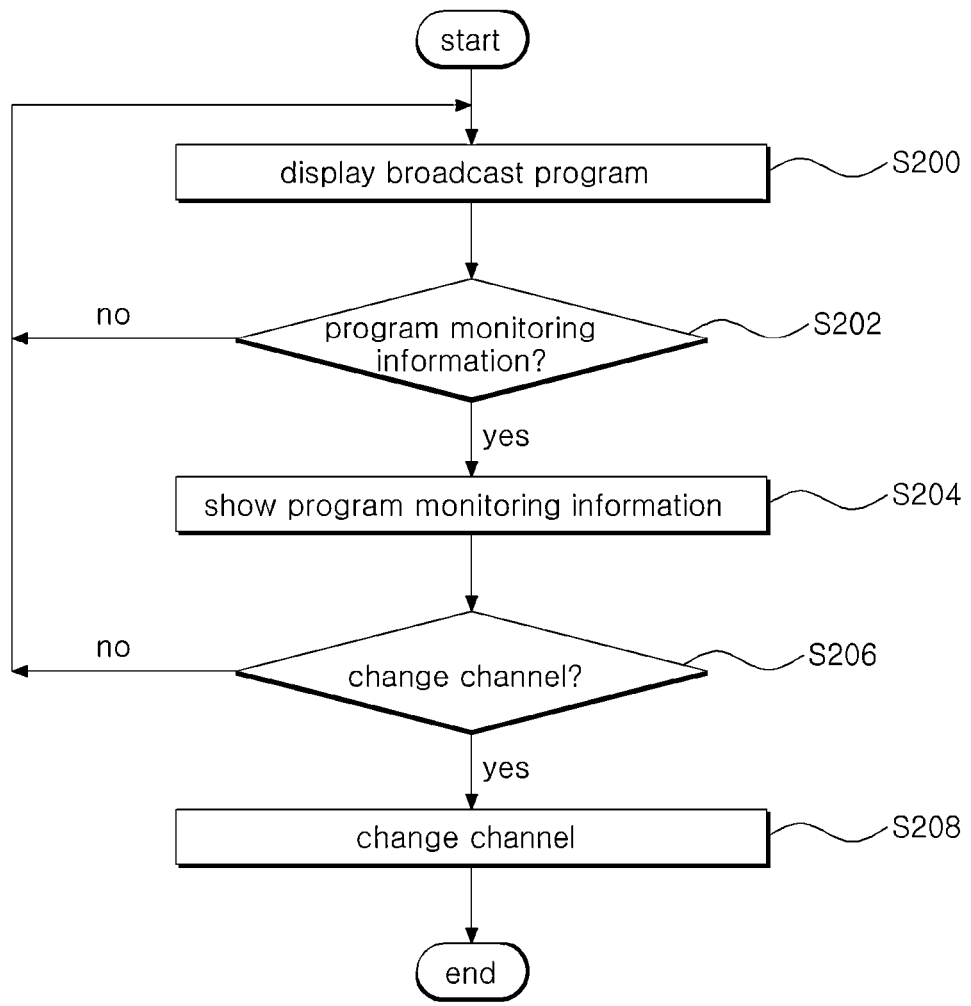
FIG. 2 is a flowchart illustrating a method of providing program monitoring information according to an embodiment of the invention.
Figure 3:
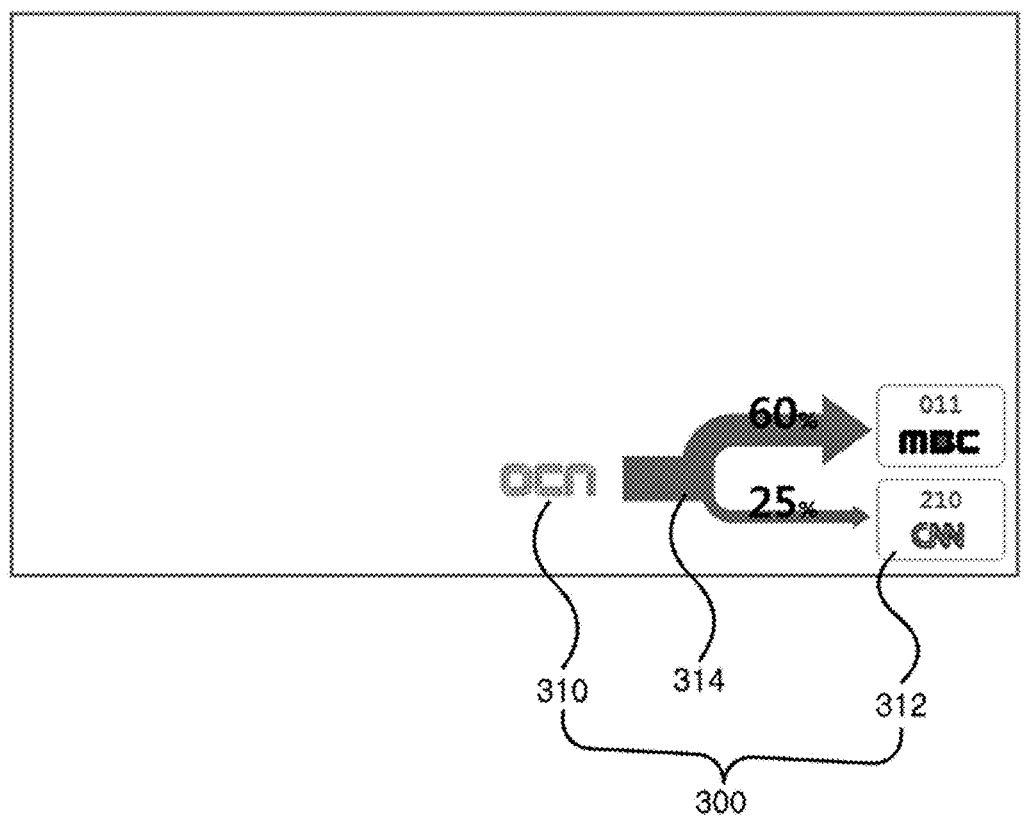
FIG. 3 illustrates a method of providing program monitoring information according to a first embodiment of the invention.

FIG. 2 is a flowchart illustrating a method of providing program monitoring information according to an embodiment of the invention, and FIG. 3 illustrates a method of providing program monitoring information according to a first embodiment of the invention.

Referring to FIG. 2, the broadcast terminal 102 may display a broadcast program (S200).

Then, it may be determined whether or not a user (viewer) of the broadcast terminal 102 has inputted a command to activate the program monitoring information (S202).

If the user does not input the activation command, the broadcast terminal 102 may return to operation S200.

Conversely, if the user does input the activation command, for example, if the user selects a particular button on a remote controller device (e.g. a remote control) to input an activation command to the broadcast terminal 102 for activating the program monitoring information, then the broadcast terminal 102 may show the program monitoring information, which may be transmitted from the headend 100, etc., over the broadcast program (S204). For example, the broadcast terminal 102 can show the program monitoring information as illustrated in FIG. 3. Specifically, the program monitoring information can convey channel-changing information of viewers who were watching the same channel and can include a currently viewed channel object 310, a changed channel object 312, and a channel change rate object 314. The program monitoring information of FIG. 3 conveys that the channel currently viewed by the user is "OCN", that the percentage of viewers from among those who were watching "OCN" who have changed channels to the "MBC" channel is 60%, and that the percentage of the viewers who have changed channels to the "CNN" channel is 25%. Consequently, the user can identify that the percentage of viewers who are currently continuing to watch "OCN" is about 15%. Thus, the user can identify that most of the viewers who were watching the same channel have moved to the "MBC" channel, and as such, can speculate that there is a more interesting broadcast program being broadcasted on the "MBC" channel. According to another embodiment of the invention, the channel change rate can be the percentage of viewers who have changed to a particular channel from among all viewers who have changed channels. However, this type of channel change rate cannot reveal the percentage of viewers still watching the broadcast program currently being viewed by the user, and it may thus be preferable to have the channel change rate represent the percentage of viewers who have changed to a particular channel from among the viewers who were watching the channel being watched by the user. Although it was not mentioned above, the thickness or color, etc., of the arrows and the like can be made different according to the channel change rate of the channel change rate object 314. Also, while the changed channel objects 312 are illustrated in FIG. 3 by logos and the corresponding channel numbers, they can also be shown by the titles of the programs being broadcasted on the changed channels.

Continuing on with the description of FIG. 2, it may be determined whether or not a request to change channels is made by the user (S206).

If there is no channel change request from the user, then the process may return to operation S200.

Conversely, if there is a channel change request from the user, the broadcast terminal 102 may change from the current channel to the requested channel (S208). In general, a user may change channels to the channel having the highest channel change rate for the channel change rate object 314, but it is also possible for the user to change to a particular channel that does not have the highest channel change rate for the channel change rate object 314.

According to an embodiment of the invention, the user can change the channel of the broadcast terminal 102 by selecting a channel number on a remote controller device.

According to another embodiment of the invention, the changed channel object 312 can function as an activation part for changing channels. That is, the user can select a changed channel object 312 by using a remote controller device or a touch means, etc., as a result of which the current channel can be changed to the selected channel. For example, if the user selects the changed channel object 312 for "MBC", which has the highest channel change rate, then the current channel can be switched to the "MBC" channel.

Although it may seem that the description above mentions operation S202 as an essential operation, said operation S202 can be omitted. That is, the program monitoring information can be continuously shown over the broadcast program for as long as the user watches the broadcast program, or the program monitoring information can be shown over the broadcast program automatically if a particular criterion is met. For example, if 50% or more of the viewers who were watching the current channel change to a different channel, or if the viewership rating of the program of a particular channel becomes 10%, etc., then the program monitoring information can be shown automatically over the broadcast program.

A description was provided above of a method of providing program monitoring information when viewers who were watching the same channel change to different channels. This method of providing program monitoring information can be applied in a similar manner to a system for providing monitoring information to viewers having similar viewing preferences. For example, for viewers having similar viewing preferences, even when the channels currently being viewed are different, the channel-viewing circumstances of the viewers can be provided as program monitoring information to a user of a broadcast terminal 102.

In short, a method of providing program monitoring information based on an embodiment of the invention may provide the corresponding viewer with channel-changing information in particular.

However, such a method of providing program monitoring information can considerably increase the load on the headend 100. Thus, it is also conceivable to have the headend 100 monitor the channel-changing circumstances of viewers within a particular region, for example viewers in the Gangnam-gu district, and provide the viewers in the particular region with the channel-changing information, i.e. program monitoring information. In another example, the headend 100 can also monitor the channel-changing circumstances for only those viewers designated beforehand by the user, such as friends of the users, for example, and provide the user with their channel-changing information, i.e. program monitoring information. In still another example, the headend 100 can randomly select some of the viewers watching the same channel and include the channel-changing circumstances of the selected viewers in the program monitoring information provided to the user. In still another example, a group can be configured that includes the user, and the headend 100 can provide the user with program monitoring information that reflects the channel-changing circumstances of the viewers belonging to the group. Here, a group can be a group that includes viewers designated beforehand by the user, or a group that includes viewers matching a particular criterion, such as women in their 20's, female office workers, etc. The viewers matching a particular criterion can be selected according to the user's request or can be chosen randomly or according to preconfigured criteria. That is, the selection of viewers whose choices are to be incorporated in the program monitoring information is not limited to a particular method and can be achieved by a variety of methods.

Although FIG. 3 illustrates the program monitoring information as including channel change rate objects 314, it is also possible for the changed channel objects 312 to function as channel change rates, without showing the changed channel rates separately. For example, showing a changed channel object 312 in a red color can indicate that the channel change rate is 50% or higher, and showing a changed channel object 312 in a light blue color can indicate that the channel change rate is 20%-30%. Of course, the changed channel object 312 can also perform the function of activating the corresponding channel.

Also, although FIG. 3 illustrates the program monitoring information as including a current channel object 310, the current channel object 310 can be omitted. This is because the user would be aware of the channel that he/she is watching and it may not be necessary to inform the user of the current channel information.

Figure 4:
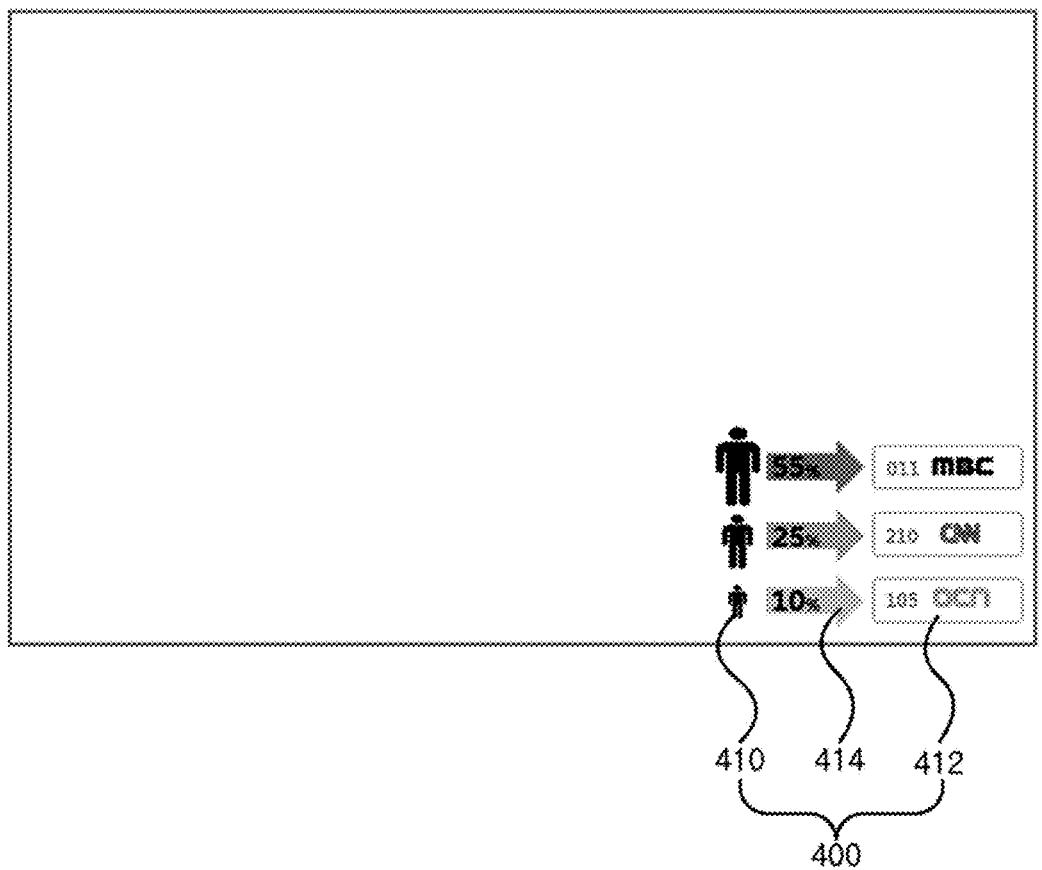
FIG. 4 illustrates a method of providing program monitoring information according to a second embodiment of the invention.

FIG. 4 illustrates a method of providing program monitoring information according to a second embodiment of the invention.

Referring to FIG. 4, the program monitoring information 400, such as channel-changing information, for example, may be shown on at least a portion of the screen of the broadcast terminal 102.

The program monitoring information 400 can include a viewer object 410, a movement indication object 414, and a changed channel object 412.

The viewer object 410 can be shown as an image representing viewers. According to an embodiment of the invention, the viewer objects 410 can be shown in different sizes according to the channel change rate, as illustrated in FIG. 4. Of course, the viewer objects 410 can be represented in different colors according to the channel change rate, and can have different sizes and colors.

The movement indication object 414 can be an object that indicates the movements of the viewers and can be shown as arrows, for example, as illustrated in FIG. 4. According to an embodiment of the invention, the channel change rates can be shown on the movement indicator objects 414, and the shapes or colors of the movement indicator objects 414 can be varied according to the channel change rates.

The changed channel object 412 can be an object that indicates a channel to which viewers have moved, and can include, for example, a logo and a channel number.

Figure 5:
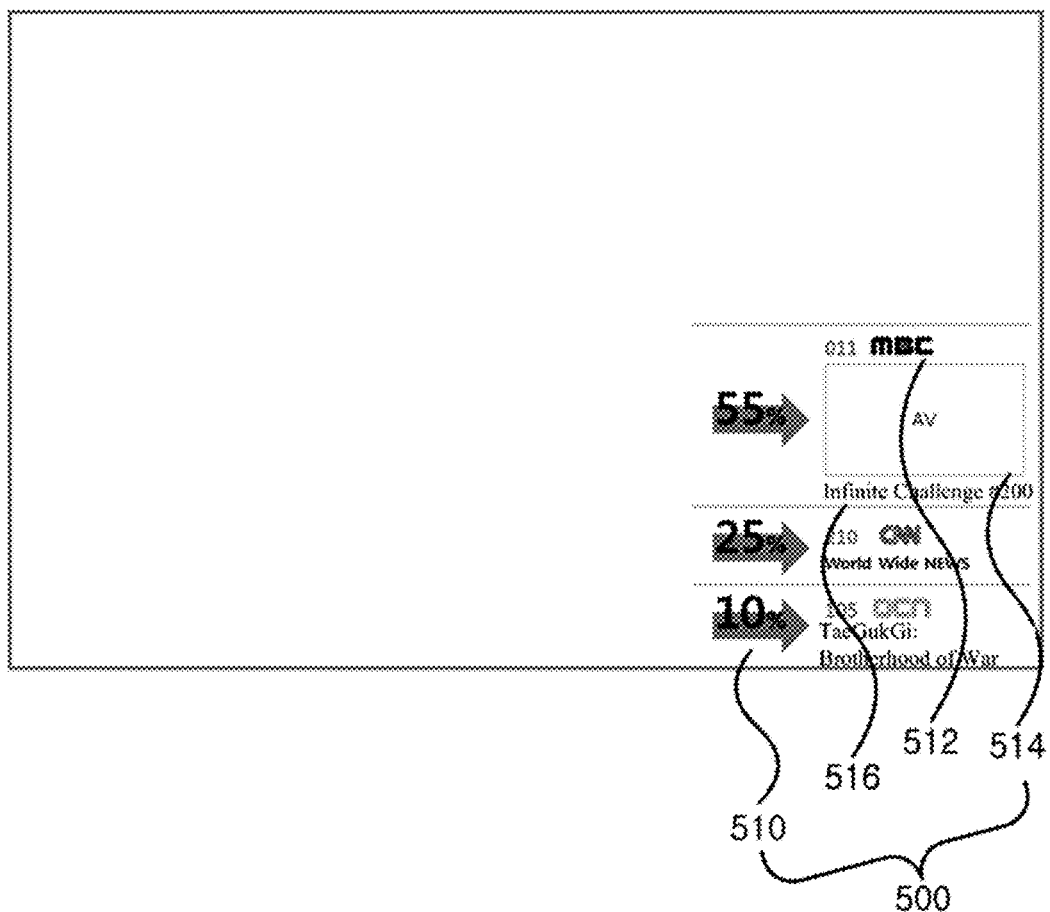
FIG. 5 illustrates a method of providing program monitoring information according to a third embodiment of the invention.

FIG. 5 illustrates a method of providing program monitoring information according to a third embodiment of the invention.

Referring to FIG. 5, the program monitoring information 500, such as channel-changing information, for example, may be shown on at least a portion of the screen of the broadcast terminal 102.

The program monitoring information 500 can include a movement indication object 510, a changed channel object 512, a changed-channel image object 514, and a program name object 516.

The movement indication object 510 can be object for indicating the channel-changing circumstances of viewers, and can be shown as an arrow, etc. Also, the channel change rate can be additionally shown on the movement indicator object 510.

The changed channel object 512 can be an object that indicates a channel to which viewers have moved, and can include, for example, a logo and a channel number.

The changed-channel image object 514 can be an object that shows an image or a picture of the program being broadcasted on the changed channel, and for example can show at least a portion of the broadcast program live within a small window box or show a promotion for the broadcast program. The changed-channel image objects 514 can be shown in correspondence to the channels having the highest channel change rates or can be shown in correspondence to all of the changed channels.

The program name object 516 may be an object that indicates the name of the program being broadcasted on the changed channel.

Summarizing the method of providing program monitoring information described above with reference FIG. 3 to FIG. 5, the program monitoring information can be shown through various methods, but in order to facilitate the user's decision on whether or not to change channels, it may be preferable to include information on the channel change rates and the changed channels.

Figure 6A:
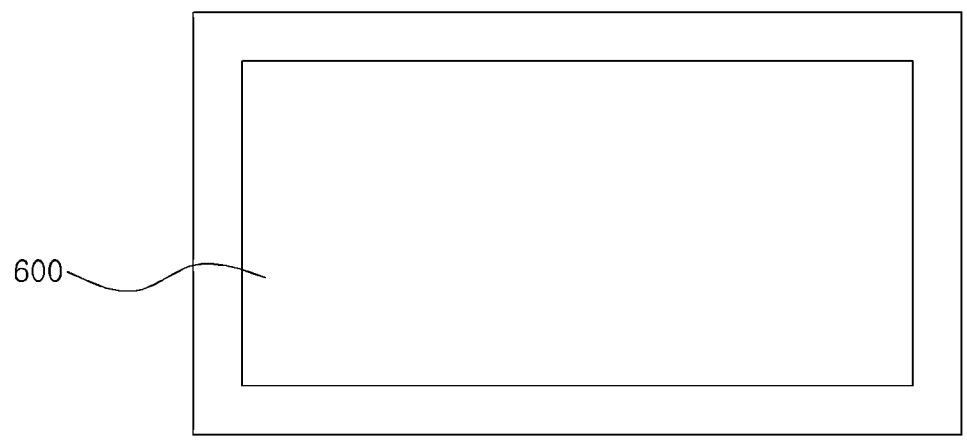
FIG. 6A and FIG. 6B illustrate a method of providing program monitoring information according to another embodiment of the invention.
Figure 6B:
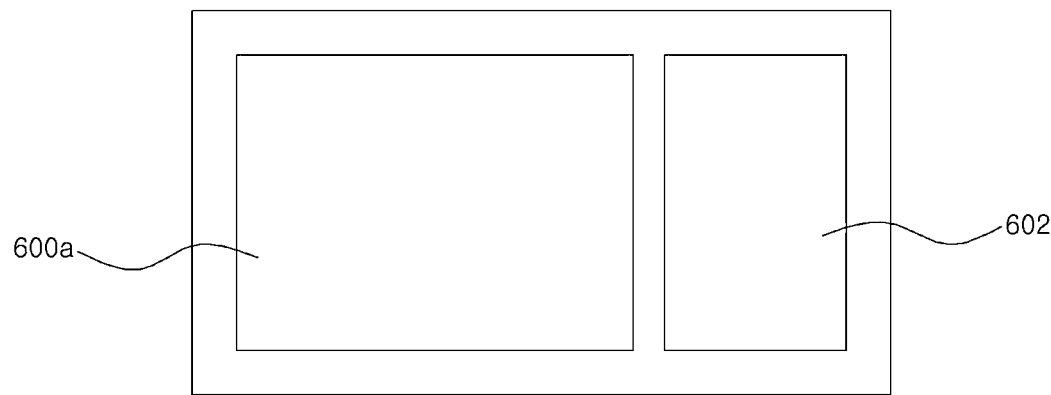
Figure 7:
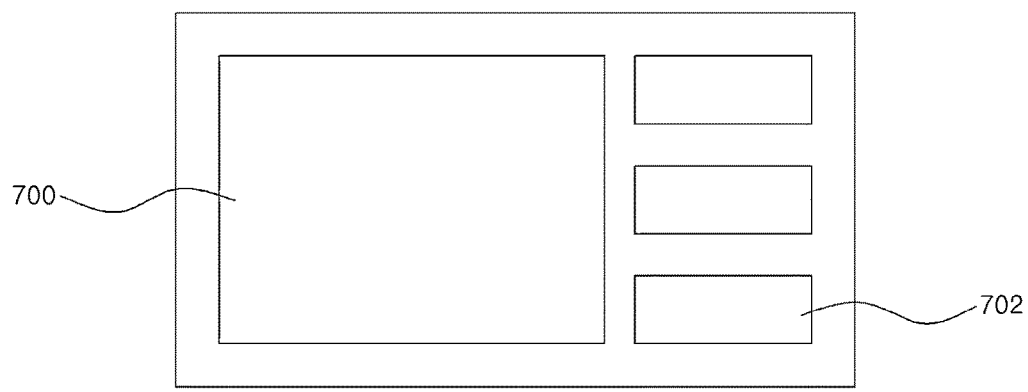
FIG. 7 illustrates a method of providing program monitoring information according to yet another embodiment of the invention.

FIG. 6A and FIG. 6B illustrate a method of providing program monitoring information according to another embodiment of the invention, and FIG. 7 illustrates a method of providing program monitoring information according to yet another embodiment of the invention.

While a program display area 600 is being displayed with the current program shown as a full screen, as illustrated in FIG. 6A, if the user inputs an activation command, the program display area 600a can be displayed in a smaller size, and a monitoring information display area 602 which shows the program monitoring information can be displayed near the program display area 600a, as illustrated in FIG. 6B. Of course, the program may be displayed in a down-scaled form in the program display area 600a. That is, the program and the program monitoring information may be displayed visually separated in different areas.

According to an embodiment of the invention, if the user selects a particular changed-channel image object in the program monitoring information, the program of the corresponding changed channel can be displayed on the full screen or in the program display area 600a replacing the program. In this case, the program monitoring information can continue to be shown in the monitoring information display area 602, and the program can be displayed in the monitoring information display area 602 or in an area excluding the areas 600a and 602. Thus, if the user loses interest while watching the program of the changed channel, the user can select the program displayed in this area to return to watching the original program.

According to another embodiment of the invention, the program monitoring information can also be displayed over the currently-broadcasted program with a degree of transparency perceivable by the user. The program monitoring information can be displayed over the whole area of the program with a degree of transparency configured beforehand, or can be displayed over a portion of the whole area of the program with a degree of transparency configured beforehand.

According to yet another embodiment of the invention, changed-channel image display areas 702 can be displayed near the program display area 700, as illustrated in FIG. 7, and changed-channel image objects can be shown within the changed-channel image display areas 702. Also, channel change rate objects can be additionally displayed near the program display area 700. If the user selects a changed-channel image object, the program of the corresponding changed-channel can be displayed instead of the current program.

Although FIG. 6A, FIG. 6B, and FIG. 7 illustrate examples in which the program monitoring information is arranged at the side of the program, the program monitoring information can also be arranged above, below, etc., of the program without limit.

Figure 8:
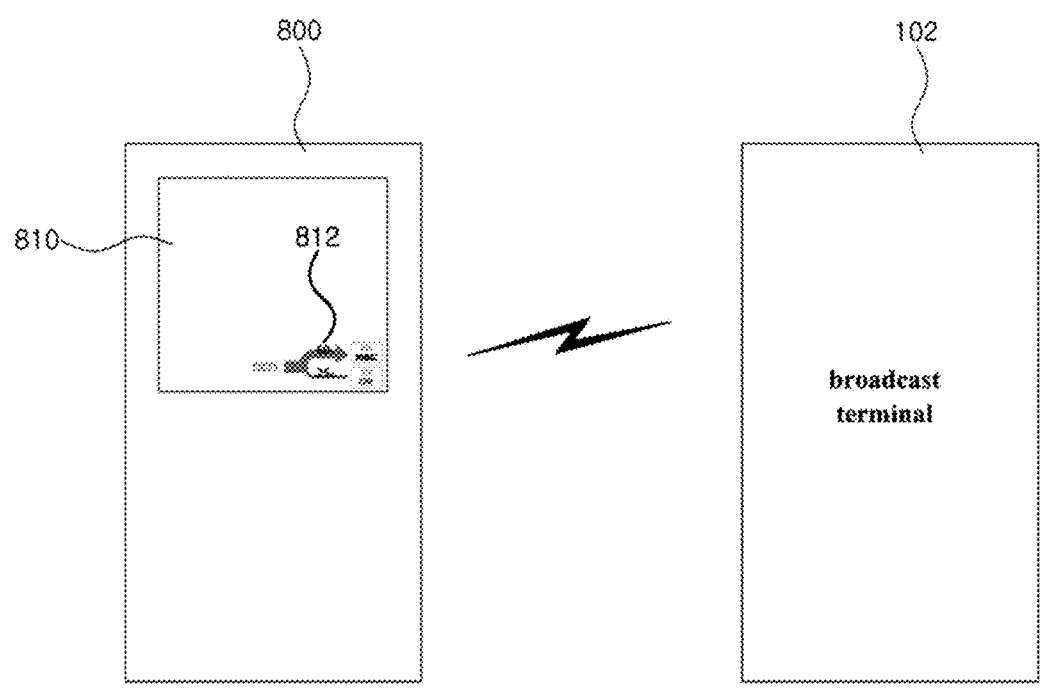
FIG. 8 illustrates a broadcasting system according to a second embodiment of the invention.

FIG. 8 illustrates a broadcasting system according to a second embodiment of the invention.

Referring to FIG. 8, the broadcasting system of this embodiment may include a broadcast terminal 102 and a remote controller device 800. Of course, the broadcasting system can additionally include a headend.

The remote controller device 800 may be a device that communicates with the broadcast terminal 102 and for example can be a remote control that controls the operation of the broadcast terminal 102 and can receive program monitoring information 812 from the broadcast terminal 102 or a headend to display the program monitoring information 812. The remote controller device 800 is not limited to a remote control, and can be a device that includes a display unit 810 capable of showing the program monitoring information 812 such as, for example, a smart phone, a tablet PC, etc.

According to an embodiment of the invention, if the user inputs an activation command while watching a particular program through the broadcast terminal 102, the program monitoring information 812 can be displayed on the display unit 810 of the remote controller device 800. The program monitoring information 812 can be implemented in various ways, as described above for certain embodiments of the invention.

In short, in a broadcasting system based on an embodiment of the invention, the program monitoring information 812 can be shown on a remote controller device 800 connected with a broadcast terminal 102, instead of being displayed on the broadcast terminal 102 itself.

According to another embodiment of the invention, the remote controller device 800 and the broadcast terminal 102 can both display the program monitoring information 812.

Figure 9:
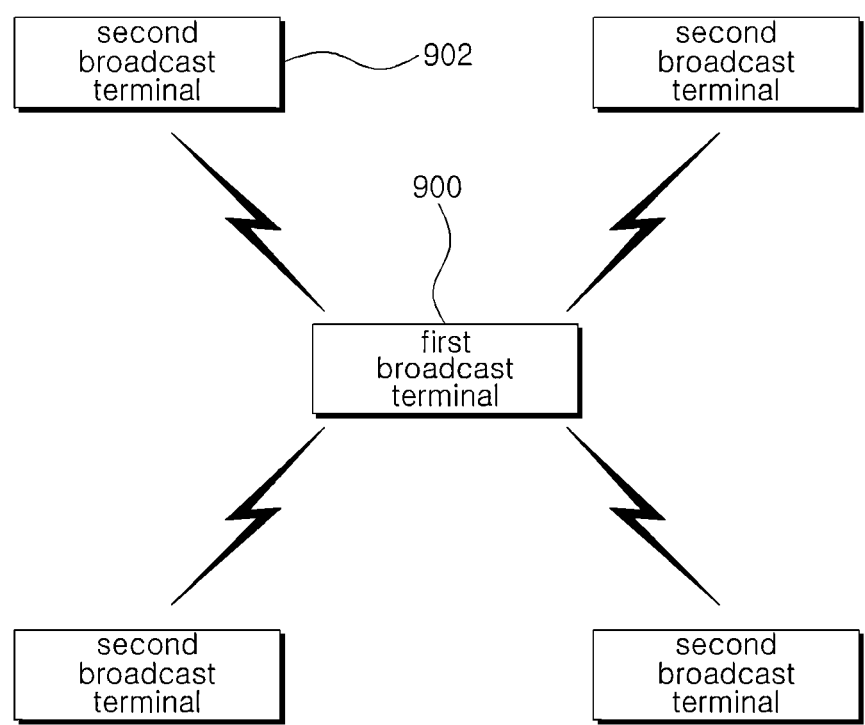
FIG. 9 illustrates a broadcasting system according to a third embodiment of the invention.
Figure 10:
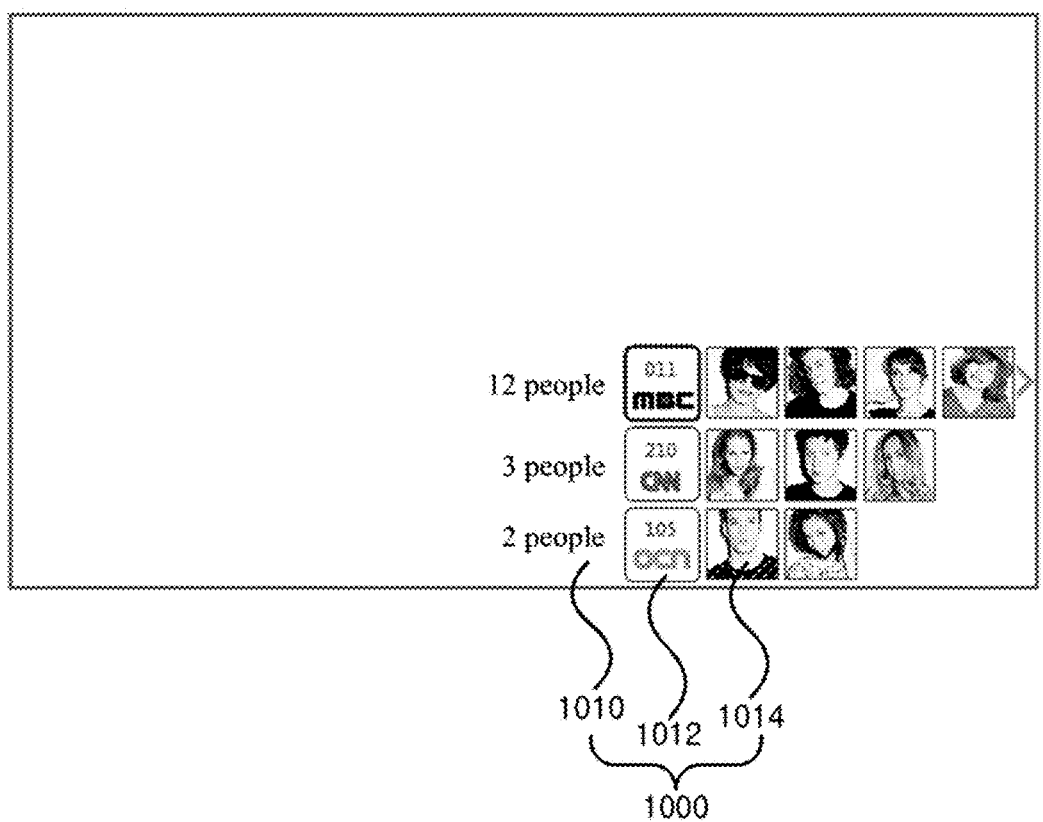
FIG. 10 illustrates the screen of a broadcast terminal according to an embodiment of the invention.

FIG. 9 illustrates a broadcasting system according to a third embodiment of the invention, and FIG. 10 illustrates the screen of a broadcast terminal according to an embodiment of the invention.

Referring to FIG. 9, a broadcasting system according to this embodiment may include a first broadcast terminal 900 and at least one second broadcast terminal 902.

The first broadcast terminal 900 can be the terminal on which a user watches a program, and the second broadcast terminals 902 can be terminals on which viewers who have agreed to mutual program monitoring with the user, such as friends, people of a particular group, and members of a club, for example, watch broadcasts.

When the user and the viewers are watching broadcasts by using their respective broadcast terminals 900, 902, the second broadcast terminals 902 may transmit information on the program being displayed, i.e. program viewing information, to the first broadcast terminal 900. The first broadcast terminal 900 can collect and analyze the program viewing information transmitted from the second broadcast terminals 902 to generate program monitoring information, and can display on its screen the program monitoring information thus generated. The program monitoring information according to any of the embodiments described above can be applied to the program monitoring information of this embodiment. According to another embodiment of the invention, the program monitoring information 1000 can include, as illustrated in FIG. 10, a viewer number object 1010, a changed-channel object 1012, and a user profile 1014 such as, for example, a viewer photo.

In short, in a broadcasting system based on this embodiment, the broadcast terminals of a particular group can collect program viewing information regarding programs viewed on other broadcast terminals, and can display program monitoring information according to the collected results. Here, the collecting of information for the programs can be performed at various devices such as, for example, a TV, a set-top box, a tablet PC, a smart phone, etc. Also, the collecting of the program viewing information and the generating of the program monitoring information can be performed at different apparatuses, and the generation of the program monitoring information can be performed at the TV.

According to another embodiment of the invention, the broadcast terminals of the group can be terminals arbitrarily chosen at the headend. That is, the headend can arbitrarily group viewers who are watching the same broadcast.

Figure 11:
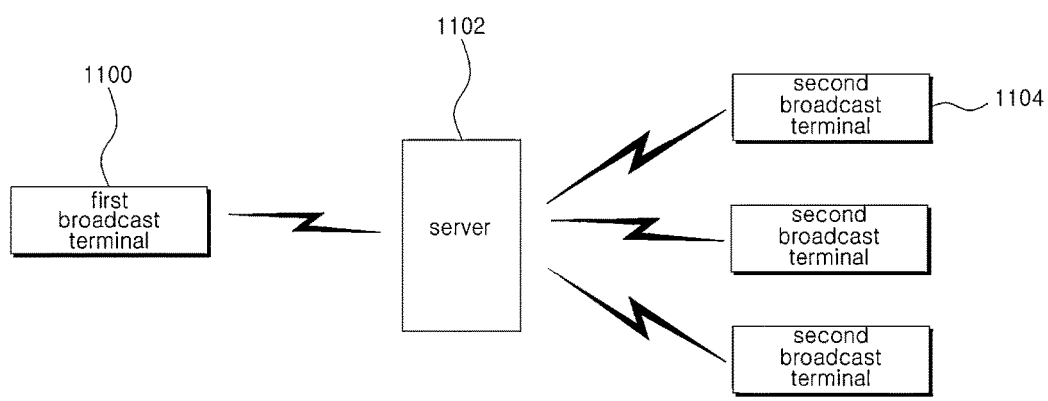
FIG. 11 illustrates a broadcasting system according to a fourth embodiment of the invention.

FIG. 11 illustrates a broadcasting system according to a fourth embodiment of the invention.

Referring to FIG. 11, a broadcasting system based on this embodiment may include a first broadcast terminal 1100, a server 1102, and at least one second broadcast terminal 1104.

Unlike the third embodiment, the present embodiment includes a server 1102, where the server 1102 may collect program viewing information from the second broadcast terminals 1104 and analyze the collected viewing information to generate program monitoring information for the first broadcast terminal 1100. The server 1102 can transmit the program monitoring information thus generated to the first broadcast terminal 1100, and the first broadcast terminal 1100 can display the program monitoring information thus transmitted.

According to another embodiment of the invention, the server 1102 can collect the program viewing information from the second broadcast terminals 1104 and transfer the collected program viewing information as is to the first broadcast terminal 1100. In this case, the first broadcast terminal 1100 can analyze the transmitted program viewing information to generate the program monitoring information and can display the program monitoring information thus generated.

According to still another embodiment of the invention, the broadcasting system may not include the server 1102, and one of the second broadcast terminals 1104 can serve the role of the server.

Figure 12:
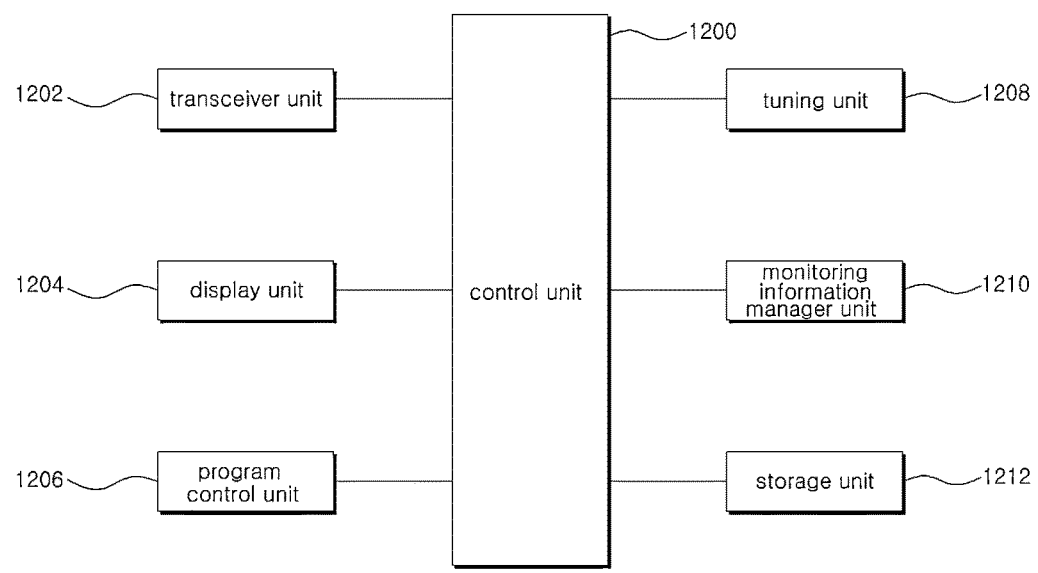
FIG. 12 illustrates a broadcast terminal according to an embodiment of the invention.

FIG. 12 illustrates a broadcast terminal according to an embodiment of the invention.

Referring to FIG. 12, a broadcast terminal based on an embodiment of the invention may be a terminal that displays program monitoring information to the user and may include a control unit 1200, a transceiver unit 1202, a display unit 1204, a program control unit 1206, a tuning unit 1208, a monitoring information manager unit 1210, and a storage unit 1212.

The transceiver unit 1202 may serve as a path that connects with a headend, other broadcast terminals, or a server.

The display unit 1204 may display a program and the program monitoring information, and can be an OLED, LCD, PDP, etc., for example.

The program control unit 1206 may control the overall playing, etc., of the broadcast program, VOD, and the like.

The tuning unit 1208 may enable the user to, while watching a first program, tune to the channel of a second program or tune to multiple channels based on the program monitoring information.

The monitoring information manager unit 1210 may control operations related to the program monitoring information, such as generating the program monitoring information or displaying on the display unit 1204.

The storage unit 1212 may store various data such as the program monitoring information and the like.

The control unit 1200 may control the overall operations of the components of the broadcast terminal.

According to another embodiment of the invention, the broadcast terminal can further include a collector unit, which may collect program viewing information from other broadcast terminals, and an information unit, which may generate the program monitoring information based on the collected program viewing information. Here, the other broadcast terminals can be the terminals of the viewers of a group to which the user of the broadcast terminal belongs.

Figure 13:
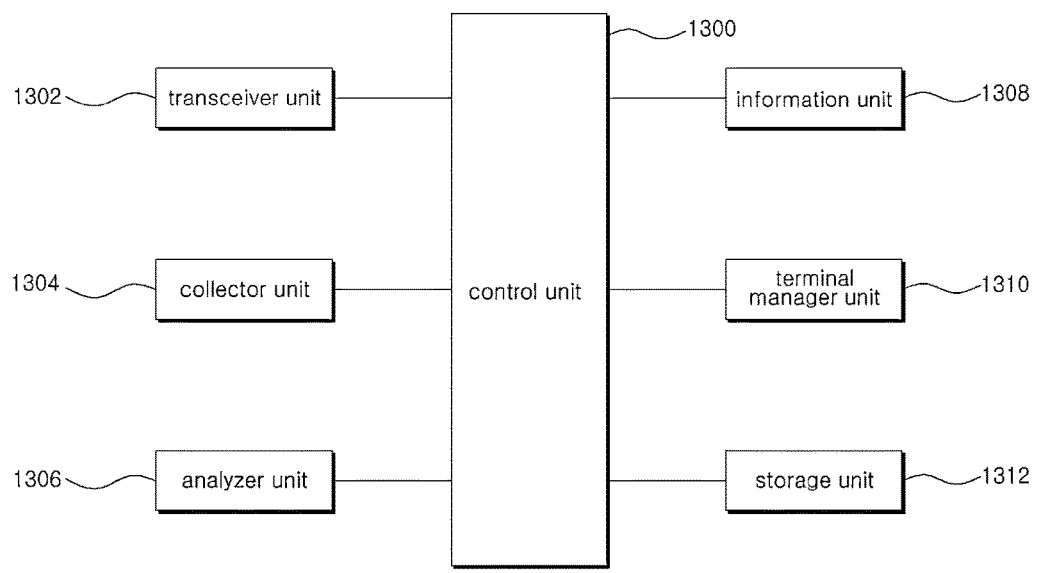
FIG. 13 is a block diagram illustrating a server according to an embodiment of the invention.

FIG. 13 is a block diagram illustrating a server according to an embodiment of the invention.

Referring to FIG. 13, a server based on this embodiment can include a control unit 1300, a transceiver unit 1302, a collector unit 1304, an analyzer unit 1306, an information unit 1308, a terminal manager unit 1310, and a storage unit 1312.

The transceiver unit 1302 may serve as a connection path with a first broadcast terminal and at least one second broadcast terminal.

The collector unit 1304 may collect program viewing information from the second broadcast terminals, and the analyzer unit 1306 may analyze the collected program viewing information.

The information unit 1308 may generate program monitoring information based on the analyzed program viewing information and may transmit the generated program monitoring information through the transceiver unit 1302 to the first broadcast terminal.

The terminal manager unit 1310 may generally manage the connection to and operation of the first broadcast terminal and the connection to and operation of the second broadcast terminals.

The storage unit 1312 may store various data such as the collected program viewing information and the generated program monitoring information, etc.

The control unit 1300 may control the overall operations of the components of the server.

Although the description above refers to a server, in cases where a second broadcast terminal performs the role of the server, then said second broadcast terminal can include the components illustrated in FIG. 13.

The embodiments of the invention described above are disclosed for illustrative purposes. Those having ordinary skill in the field of art to which the present invention pertains would understand that various modifications, alterations, and additions can be made without departing from the spirit and scope of the present invention and that such modifications, alterations, and additions are encompassed by the scope of claims below.

What is claimed is:

1. A user terminal comprising:
   a display unit configured to display a particular program; and
   a monitoring information manager unit configured to display program monitoring information through the display unit, wherein
   the program monitoring information informs a viewer of the user terminal of channel changes made by at least one other viewer of at least one other terminal different from the user terminal,
   the program monitoring information includes information involving a channel-changing circumstance in which the user terminal and the at least one other terminal display the same program of a first channel simultaneously, and the at least one other terminal subsequently changes from the program of the first channel to at least one program of one or more other channels different from the first channel,
   the at least one program of the one or more other channels is different from the program of the first channel,
   broadcasting is displayed without displaying the program monitoring information when a specific criterion relating to at least one of channel-changing, a channel change rate, and a viewership rating is not met,
   the program monitoring information is automatically displayed with the broadcasting on the screen when the specific criterion is met while the user terminal is activated,
   the program monitoring information indicates a proportion of other terminals which change from the program of the first channel to the at least one program of the one or more other channels,
   the program monitoring information includes a channel change rate object and a changed channel object, the channel change rate corresponding to the percentage of viewers who have changed to the other channel from among the viewers who were watching the first channel being watched by the user,
   the program monitoring information further includes at least one of a currently viewed channel object, a movement indication object, a changed-channel image object, and a user profile of the other terminal, and
   when the changed channel object or the changed-channel image object is selected, a screen of the user terminal automatically switches to a channel corresponding to the selection.

2. The user terminal of claim 1, wherein a size or a color of the movement indication object or the channel change rate object varies according to a channel change rate.

3. The user terminal of claim 1, wherein the particular program and the program monitoring information are displayed in different areas on the display unit.

4. The user terminal of claim 1, wherein the other terminals are broadcast terminals randomly chosen by a headend.

5. The user terminal of claim 1, wherein the other terminals are terminals of viewers of a group to which a user of the user terminal belongs, and the user terminal further comprises:
   a collector unit configured to collect program viewing information from the other terminals; and
   an information unit configured to generate the program monitoring information based on the collected program viewing information.

6. A method of providing program monitoring information, the method comprising:
   showing a first program on a first terminal; and
   showing program monitoring information based on program viewing information of at least one second terminal different from the first terminal on the first terminal, wherein
   the program monitoring information informs a viewer of the first terminal of channel changes made by at least one other viewer of the at least one second terminal different from the first terminal,
   the program monitoring information includes information involving a channel-changing circumstance in which the first terminal and the at least one second terminal display the same program of a first channel simultaneously, and the at least one second terminal subsequently changes from the program of the first channel to at least one program of one or more other channels different from the first channel,
   the at least one program of the one or more other channels is different from the program of the first channel,
   broadcasting is displayed without displaying the program monitoring information when a specific criterion relating to at least one of channel-changing, a channel change rate, and a viewership rating is not met, the program monitoring information is automatically displayed with the broadcasting on the screen when the specific criterion is met while the user terminal is activated, the program monitoring information indicates a proportion of other terminals which change from the program of the first channel to the at least one program of the one or more other channels, the program monitoring information includes a channel change rate object and a changed channel object, the channel change rate corresponding to the percentage of viewers who have changed to the other channel from among the viewers who were watching the first channel being watched by the user, the program monitoring information further includes at least one of a currently viewed channel object, a movement indication object, a changed-channel image object, and a user profile of the other terminal, and when the changed channel object or the changed-channel image object is selected, a screen of the first terminal automatically switches to a channel corresponding to the selection.

7. The method of claim 6, further comprising:

collecting the program viewing information; and generating the program monitoring information based on the collected program viewing information, wherein the collecting and the generating are performed at a server or at one of the second terminals.

\* \* \* \* \*